(12) United States Patent
Alliot (10) Patent No.: US 7,993,077 B2
(45) Date of Patent: Aug. 9, 2011

(54) TOWING AND SUBSEA INSTALLATION OF LONG ARTICLES

(75) Inventor: Vincent Marcel Ghislain Alliot, Paris (FR)

(73) Assignee: Acergy France S.A., Suresnes (FR)

( * ) Notice: Subject to any disclaimer, the term of this patent is extended or adjusted under 35 U.S.C. 154(b) by 231 days.

(21) Appl. No.: 11/918,303

(22) PCT Filed: Apr. 28, 2006

(86) PCT No.: PCT/EP2006/005315
§ 371 (c)(1),
(2), (4) Date: Feb. 24, 2009

(87) PCT Pub. No.: WO2006/117249
PCT Pub. Date: Nov. 9, 2006

(65) Prior Publication Data
US 2009/0293792 A1    Dec. 3, 2009

(30) Foreign Application Priority Data

May 5, 2005 (GB) ................................. 0509179.8
Jun. 25, 2005 (GB) ................................. 0513015.8

(51) Int. Cl.
*F16L 1/00* (2006.01)
(52) U.S. Cl. ...................................... 405/158; 114/253
(58) Field of Classification Search .................. 114/253; 405/158
See application file for complete search history.

(56) References Cited

U.S. PATENT DOCUMENTS

| 3,374,852 A | 3/1968 | Strange et al. |
| 3,489,182 A | 1/1970 | Cameron |
| 3,568,456 A | 3/1971 | Loenen |
| 3,698,348 A | 10/1972 | Morgan |
| 3,795,115 A | 3/1974 | Bergquist et al. |
| 4,011,729 A * | 3/1977 | Kermel ......................... 405/158 |

(Continued)

FOREIGN PATENT DOCUMENTS

DE   3923957   8/1990

(Continued)

OTHER PUBLICATIONS

Deep 7—Innovative Technology for the Subsea Industry, Issue 5, Nov. 2004.

(Continued)

*Primary Examiner* — Stephen Avila
(74) *Attorney, Agent, or Firm* — Levy & Grandinetti (57) ABSTRACT

An elongate article (100) such as a prefabricated pipeline of several kilometers length is towed through water. The article is provided along its length with buoyancy adjusting material (102) fitted closely to the article. The buoyancy adjusting material is sufficient to give the article overall a positive buoyancy so that it will not sink to the seabed, and is distributed unevenly along the length of the article so as to create regions of negative buoyancy. This causes the article to adopt a wave profile with peaks (+) and troughs (−) along its length. The article is connected at its extremities to lead and trail tugs (104, 106) for controlling movement of the article through the water. Intermediate peaks are optionally coupled to intermediate tugs (108) or buoys (702) via self-adjusting ballast chains (110). The wave profile allows the towed structure to extend without undue tension on the article itself. The article can be laid to the seabed progressively removing buoyancy elements (102) using an ROV (302).

21 Claims, 8 Drawing Sheets

U.S. PATENT DOCUMENTS

| | | | |
|---|---|---|---|
| 4,063,430 A | 12/1977 | Lamy | |
| 4,067,199 A | 1/1978 | Jegousse | |
| 4,121,529 A | 10/1978 | Smith et al. | |
| 4,145,909 A | 3/1979 | Daughtry | |
| 4,474,507 A * | 10/1984 | Morton | 405/158 |
| 4,563,108 A | 1/1986 | Ayers | |
| 4,884,249 A * | 11/1989 | Snook | 367/154 |
| 5,615,977 A | 4/1997 | Moses et al. | |
| 5,691,903 A | 11/1997 | Racette | |
| 2006/0067792 A1 | 3/2006 | Joshi et al. | |

FOREIGN PATENT DOCUMENTS

| | | |
|---|---|---|
| DE | 19710465 | 9/1998 |
| EP | 1205701 A1 | 5/2002 |
| FR | 2357807 | 3/1978 |
| FR | 2348191 | 11/1978 |
| GB | 942218 A | 11/1963 |
| GB | 1250068 | 10/1971 |
| GB | 1357691 | 6/1974 |
| GB | 2221247 A | 1/1990 |
| GB | 2309576 A | 7/1997 |
| GB | 2384537 A | 7/2003 |
| GB | 2404428 A | 2/2005 |
| JP | 59187137 | 10/1984 |
| JP | 3143216 | 6/1991 |
| WO | WO03/002848 A1 | 1/2003 |
| WO | WO03/062688 A1 | 7/2003 |

OTHER PUBLICATIONS

Pipelines and Risers, Elsevier Ocean Engineering Book Series, vol. 3, Yong Bai—pp. 17-19, pp. 177-185, pp. 462-465.

* cited by examiner

TOWING AND SUBSEA INSTALLATION OF LONG ARTICLES

CROSS REFERENCE TO RELATED APPLICATIONS

This application claims priority from GB 0509179.8 dated 5 May 2005 and GB 0513015.8 dated 25 Jun. 2005, incorporated herein by reference.

BACKGROUND OF THE INVENTION

1. Field of the Invention

The invention relates to methods of towing and installing elongate articles at sea. "Elongate articles" includes for example sections of pipeline, pipeline bundles, tendons for offshore installations and the like. It may also include other extended installations which are limited in their ability to be reeled or folded for transport to their target location. The method can be applied to long or very long articles, (several km) in shallow or ultra-deep water environment, as well as to shorter articles.

2. Description of Prior Art

As one example, many offshore production facilities require large-diameter pipelines for export of hydrocarbons to a processing terminal. The length of such flowlines may be many kilometers. Steel pipe of such diameter cannot be transported in a reeled form for installation at sea. Known techniques for transporting such articles to a subsea location include:

1. Laying the pipe with an S or J lay spread (constructing the pipeline by welding short sections together on a vessel at the target location).

2. Towing shorter lengths of pipe (up to a few km) with known tow techniques and performing surface or bottom connection at the target location to make up the entire flowline section.

A common method of towing is Controlled Depth Tow, where the article is made negatively buoyant with lengths of chain as ballast. These allow the article to rest above the seabed when static, and to rise to a controlled depth when towed at speed. Another option is submerged tow of the article with pencil buoys on surface attached to the pipe with strops.

Each of these methods has significant limitations in the types of installations that can be achieved.

SUMMARY OF INVENTION

The invention provides a method of towing an elongate article through water, wherein the article is provided along its length with buoyancy adjusting material sufficient to give the article overall a positive buoyancy so that it will not sink to the seabed, wherein said buoyancy adjusting material is fitted closely to the article and distributed unevenly along the length of the article so as to create regions of negative buoyancy causing the article to adopt a wave profile with peaks and troughs along its length, and wherein said article is connected at its extremities to lead and trail tugs for controlling movement of the article through the water.

The invention in an alternative aspect provides a method of towing an elongate article through water, the method comprising:

fitting the article with buoyancy-modifying material non-uniformly distributed along its length so as to define alternating regions of net positive buoyancy and net negative buoyancy (for example at least one region of net positive buoyancy between two regions of net negative buoyancy), whereby the article adopts a sinuate profile as its depth below the water surface varies along its length; and towing the article along a desired route between lead and trail tugs connected to the article at its extremities.

The sinuate profile provides the article as a whole with the capacity to extend or contract to accommodate variations in the tension imposed on the article by the tugs.

In one class of embodiments, the elongate article is itself negatively buoyant, said buoyancy adjusting material comprising exclusively or predominantly buoyant material.

The buoyant material may comprise a series of floats coupled closely to the article at intervals along its length.

The floats may be identical in form, the interval between floats being increased in said regions of negative buoyancy relative to other regions.

The floats may be shaped so as to lie alongside the article so as to avoid substantially increasing its cross-section with respect to cross-currents while towing. Each float may in that case comprise a pair of buoyant elements yoked together with the elongate article lying between them.

The floats are preferably detachable individually under remote control. Said remote control may for example be through the action of a remotely operated vehicle (ROV).

In another class of embodiments, the elongate article itself may be positively buoyant (for example a riser bundle cased in buoyant foam), said buoyancy adjusting material comprising ballast.

The method may include coupling at least one further tug to the article at an intermediate point between the extremities of the article. The or each further tug may be coupled to the article at or near a peak in said wave profile.

The further tug may be used to apply ballast to control the depth of the article during towing. The ballast may comprise an adjustable length of chain connecting the article to the further tug.

The further tug may be used to apply a lateral pull on the article to counteract the force of cross-currents.

There may be plural further tugs, each coupled to a different intermediate point along the length of the article. The spacing of said coupling points may be greater than 1000 m.

Said profile may include plural peaks spaced along the length. The spacing of said peaks may be greater than 1000 m. It will be appreciated that the bends imparted to the article by such a long wave profile will be well within the elastic bending limits of typical pipes.

The magnitude of buoyancy variation between peaks and troughs may be between 50 and 400 N/m. For example the net weight per unit length of the article might be approximately +/−50 N/m, +/−100 N/m or +/−150 N/m.

The optimum profile in terms of the number of peaks and the strength of the positive/negative buoyancy distribution will be dependent on the length of the article (which may be greater than 4 km or even greater than 10 km or 15 km) mechanical properties of the article per unit length, (mass, density, stiffness, tolerance of bending etc.) and the environment, including water depth and meteocean conditions at the launching location, the target location, and all points en route. This large number of variables makes the use of computerised numerical modelling and simulation important in the design process. The modelling and simulation is, however, within the capabilities of modern modelling tools such as Orcina Limited's ORCAFLEX product.

The method may further comprise the steps of:
monitoring the towing operation to measure (i) the depth of the article at known points along its length, (ii) the positions of the tugs and their respective bollard pull values; and (iii) subsea currents;
combining those measurements with a computerised model of the article to calculate one or more parameters of the operation; and
controlling the tugs in response to said calculations so as to maintain said parameters within predetermined limits.

Said monitoring may be performed using instruments operated from a plurality of surface vessels (in particular the tugs) and wireless data communications between said instruments and a central data processing system located on one of said vessels (for example the lead tug).

In another aspect, the invention comprises a method of installing an elongate article at a target location sub-sea, the method comprising:
towing the article to the target location while maintained in a buoyant condition by buoyant material applied to the article and distributed continuously or at regular intervals along its length;
sinking a first end of the article to the seabed at the target location using ballast while applying a predetermined tension on the other end to maintain the form of the article within predefined limits; and
removing the buoyant material progressively along the length of the article so as to sink the article and lay it progressively along a desired path on the seabed, maintaining and controlling the applied tension as the laying progresses.

A method as set forth above, wherein the desired path is curved, the direction of said applied tension being varied as said sinking progresses so as to cause the article to bend to said curved path during laying.

The buoyant material may be in the form of numerous discrete floats applied to the article and removable individually by remote control (for example by ROV).

In yet another aspect, the invention provides buoyant device for coupling to an elongate article and subsequent decoupling by remote control, the buoyant device comprising a pair of bodies adapted to lie either side of a portion of the elongate article and being provided with first coupling means for forming a pivotal coupling between the device and a first point on said article to permit the device to pivot into and out of alignment with the article, the device further being provided with second coupling means for binding the device to a second point on the article so as to maintain the device in alignment, wherein the distribution of buoyant material relative to said coupling means is such that the device will pivot out of alignment with the article when the second coupling means is released and wherein the first coupling means has an open portion adapted to permit separation of the device from the article when the device pivots out of alignment.

The second coupling means may comprise a strap which can be cut to release the second coupling means.

In yet another aspect, the invention provides a method of using a plurality of said buoyant devices to progressively sink an article, the second coupling means of said devices being released sequentially by remote control. The release of the second coupling means may be performed for example by ROV.

In yet another aspect, the invention provides a system for monitoring a towing operation using multiple tugs coupled to different points on an extended article at sea, the method comprising:
monitoring the towing operation to measure at least two of (i) the current position of the article at one or more points on its extent, (ii) the positions of the tugs and their respective bollard pull values; and (iii) subsea currents;
combining those measurements with a computerised model of the article to calculate one or more parameters of the operation; and
controlling the tugs in response to said calculations so as to maintain said parameters within predetermined limits, in particular to reduce fatigue and/or damaging deformation.

The invention in its various aspects increases the number of options for the designer of offshore installations involving lengthy pipelines and more specialised articles which may be of a shorter length. A detailed discussion of the benefits available relative to the known techniques described above is provided at the end of this description.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

The proposed new method (referred to herein as the "wave surface tow" method) is suitable for towing and installing elongate articles such as sections of pipeline, pipeline bundles, tendons for offshore installations and the like. The following description will refer for simplicity to a "pipe". The method can be applied to short, long or very long (many km) articles, in shallow or ultra-deep water environment.

The elements of the surface wave tow method will be described in the context of its three main phases:
A—The tow to Site (refer to FIG. 1 & FIG. 4)
B—The control of tow to Site (refer to FIG. 2)
C—The laying after the tow to Site (refer to FIG. 3 & FIG. 4)

There will then be described a numerical example with simulation results which can be used in the detailed design and performance of the method.

Finally the various benefits of the proposed method against alternative technologies will be discussed.

Figure 1:
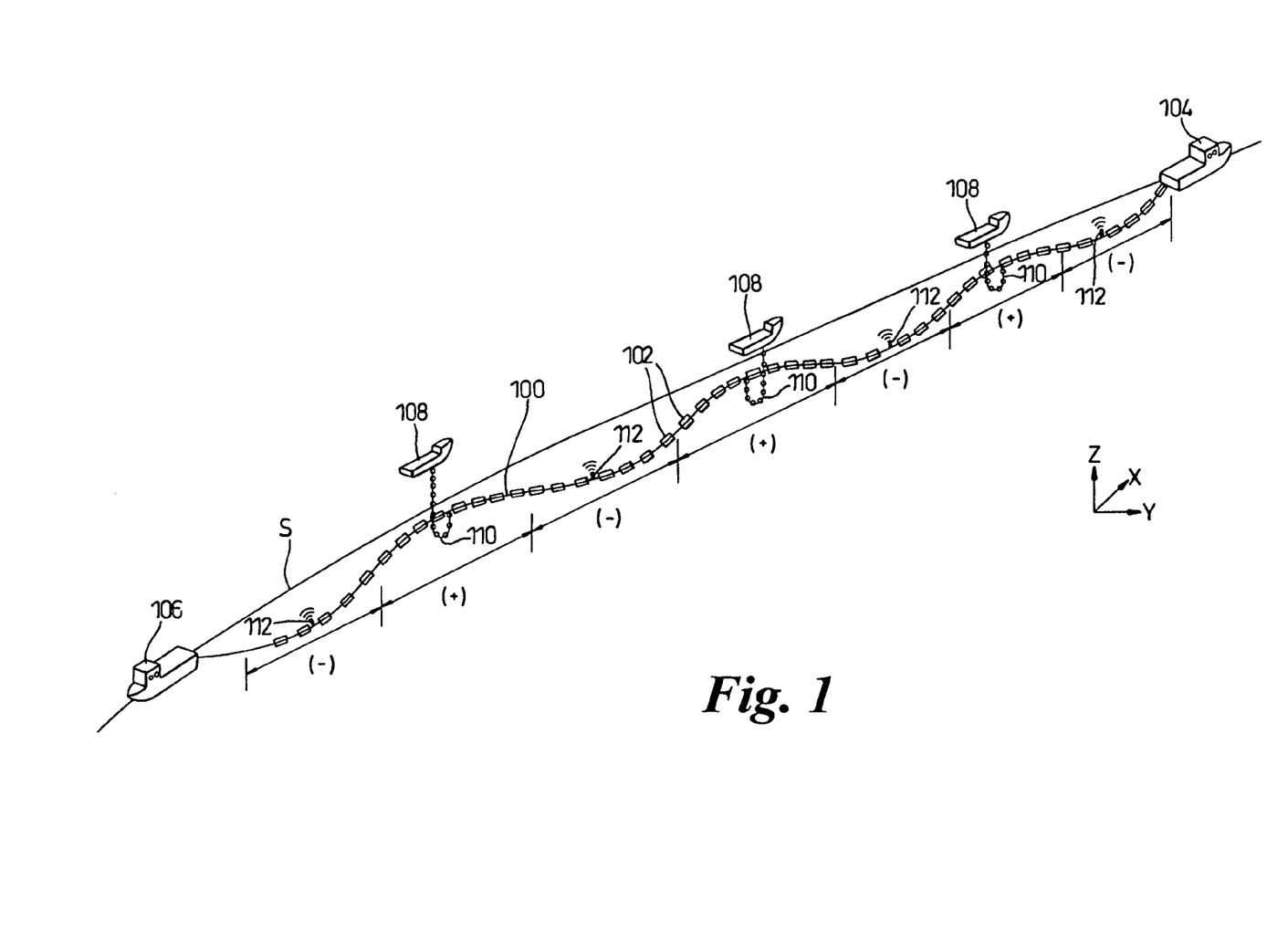
FIG. 1 shows a long pipe being towed in a novel wave surface tow configuration with three peaks and four troughs, using a total of five tugs.

A—The Tow to Site (Refer to FIG. 1 & FIG. 4)

FIG. 1 shows a pipe 100 being towed in the novel "wave surface tow" configuration beneath the sea surface S. The pipe 100 can be fabricated equally from the shore or laid from a standard lay barge in shallow water. Buoyancy elements 102 are firmly attached to the pipe by means of clamps incorporating a diverless or ROV activated release device for the buoyancy element. (See FIG. 4 and description of phase C below for more detail.)

At the leading and trailing ends of the pipe are lead tug 104 and trail tug 106 respectively. Between these, stationed every 1.5 km or so along the pipe, are three intermediate tugs 108. The pipe buoyancy is unevenly distributed along the line so that the whole pipeline assembly presents an undulating shape with some sections of pipe 100 floating at or near the sea surface S and other sections of pipe 100 totally submerged. This configuration will ensure a better control of both the pipe elevation in the vertical plane (Z axis) plan and the axial tension during towing operation. The pipe can be totally submerged, while maintaining its undulating profile, by deploying some ballast weight from one or several lead/trail or intermediate tugs. In the example illustrated, five tugs 104-108 are assigned to tow a pipe of maybe 6 km or so in length. The intermediate tugs also assist in controlling the behaviour of the pipe laterally (Y axis) to alleviate the action of the current.

More specifically, the distribution of buoyant elements 102 at each point along the pipe is calculated such that the pipe would naturally float without the ballast weight on specific sections where buoyancy elements are sufficiently numerous to provide a slight positive buoyancy (indicated on the drawing by a "+" sign) while on other sections buoyancy elements are more sparsely provided to achieve a slight negative buoyancy (indicated by a "−" sign). This alternating change of buoyancy provides the undulating shape and, since the pipe reaches the surface, it stabilises on and below the surface in its natural undulation shape.

For operational and structural reasons, it is desirable to put the pipe 100 into a submerged condition, for instance to avoid collision and to reduce fatigue damage of the structure under wave action. The novel configuration allows the pipe to be submerged just by pulling the pipe down from the section adjusted to be positively buoyant (+). Then the entire pipe length disappears from the surface and its elevation is controlled with the intermediate tugs deploying ballast weights, and the lead and trail tug 104, 106 controlling the tension. The pipe extremity can either be positively or negatively buoyant and controlled by the towline which can either provide an uplift or downwards load.

As shown in the drawings, the each ballast weight would typically comprise a chain 110 attached between each tug 108 and the floating section of the pipe 100. This allows the tugs to control the ballast weight and hence pipe elevation by paying out or winching in the chain. The chains 110 can be seen in FIG. 1. The ballast weights can additionally, or instead, comprise a deadweight (not shown).

The final configuration is driven by the parameters of each individual project, including the nature of the article being moved and environmental constraints, which are then processed through numerical modelling. Nowadays, accurate analysis and iterative refinement of such a design can be performed with the numerical modelling systems such as the well-known ORCAFLEX from Orcina Limited of Ulverston, United Kingdom.

As will be illustrated in the later examples (FIG. 5 and FIG. 7), there need not necessarily be an intermediate tug 108 at every peak of the wave profile. In most cases the intermediate tug 108 would be attached at a peak of the wave profile but this is not an absolute restriction. In principle, tugs could be attached at any point on the wave and/or only on a subset of the peaks. The aim will be to use the minimum number of tugs necessary to bring the entire pipeline down in submerged condition. It could be for example that we can achieve this to tow a pipe with three humps with only two tugs (lead and trail). The main principle to observe is that, by making this undulation shape, we provide a better way control the pipe behaviour with fewer tugs or pipe sections than would otherwise be necessary.

Figure 2:
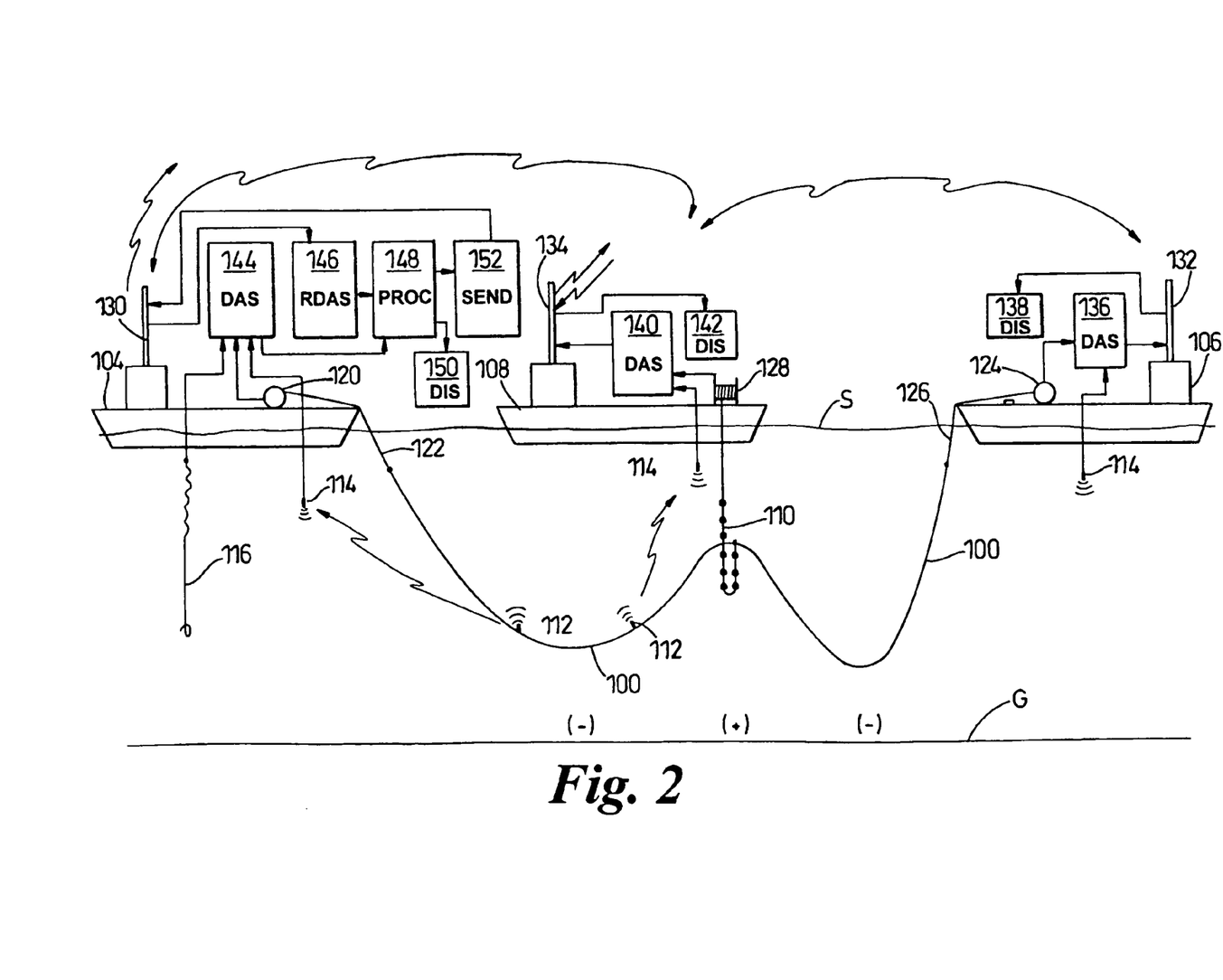
FIG. 2 illustrates schematically a tow management system used in the wave surface towing operation.

B—The Control of Tow to Site (Refer to FIG. 2)

In addition to setting up the correct wave profile along the article to be towed, the co-ordination of the towing fleet would be ensured by a tow management system which would simultaneously perform the following functions:

1. Collect operational information from each individual ship and convey it to a main data processing system.

2. Main data processing system verifies that the various ship positions and pipeline behaviour are within pre-established operational limits.

3. Main data processing system re-analyses in real time the towing conditions and sends new updated operational data and limits to the towing fleet. Alarms are set up and display accordingly on each ship monitor.

FIG. 2 illustrates the principal components of the tow management system in a simplified configuration having only one intermediate tug 108. The main data processing system in this example is located on the main lead tug 106 (shown at left in FIG. 2 and at right in FIG. 1). Acoustic transponders 112 of known type are positioned at known points along the pipe and their signals are picked up by transducers 114 carried by the nearest tug (buoyancy elements 102 are omitted for clarity). These transponders 112 can be arranged to sense their depth and communicate this through acoustic signalling, and/or their position can be detected by triangulation from an array on transducers on the ships. One or more acoustic current profilers 116 are also deployed (one shown below the lead tug) to provide information about the current in the environment at different depths. Each tug has units for the collection, processing and display of the data gathered through these instruments, and radio communication equipment to share the data and instructions with the main data processing system.

Referring to FIG. 2 in more detail, we have already mentioned the pipe 100, tugs 104, 106 and 108, a ballast chain 110, acoustic transponders 112 fitted to the pipe with corresponding transducers 114 in the ships, and depth profiler 116. Also shown schematically are the lead tug tow winch 120 and tow rope 122, also the trail tug tow winch 124 and tow rope 126, together with a winch 128 for controlling deployment of the ballast chain 110 from the intermediate tug 108.

Tugs 104, 106 and 108 are provided with radio communications equipment represented by antennas 130, 132 and 134 respectively. Each ship is also inherently provided with a dynamic positioning (DP) system, including satellite position receivers (GPS for example), control systems and thrusters (not shown). Aboard the trail tug 106, a data acquisition system 136 receives information from sensors associated with winch 124, the DP system and transducer 114 which can not only be displayed on display unit 138 but also communicated to the other vessels via antenna 132. Such data will therefore include position and velocity information for the vessel, information on the extent and load conditions on the tow rope 126 and information on the position of any transponders 112, that may be within range of transducer 114 on the trail tug 116.

Similarly, on the intermediate tug 108, a data acquisition system 140 and display 142 receive data about that vessel and both displayed locally and communicated via antenna 134 to the other vessels. In this case, the data includes position and velocity etc for the intermediate tug 108, information on the extent of the ballast chain 110 and information on the position of any transponders 112 that may be within range of transducer 114 suspended from intermediate tug 108.

On lead tug 104, there are provided: a data acquisition system 144; a remote data acquisition system 146 for receiving and decoding the data transmitted from the other vessels 106, 108 and received at antenna 130; a main data processing system 148 including a numerical model of the pipeline and ancillary equipment, for predicting pipeline behaviour; a display unit 150; and a data transmitter 152 for conveying information and commands to the other vessels, via antennae 130. Data acquisition system 144 receives sensor signals from transponder 114 attached to the lead tug 104 current profiler 116 and winch 120. This is used together with DP system data and the similar information received from the other vessels 106, 108 as inputs to the model maintained by main data processing system 148.

While tow monitoring systems are already known for multi-tug operations, a particular feature here is the re-analysis of a pipeline model and feedback of resulting information to all the tugs so that they can adjust their position in accordance with the meteorological and ocean ('meteocean') conditions. For instance, in case of a cross current we would calculate the vectorial component current speed and make sure that the pipe heading would be aligned parallel to this component. In other words, the straight line joining the lead and trail tugs will not in general be aligned exactly with the direction of towing, but rather at an angle adjusted to minimise lateral forces on the pipeline in the presence of cross-currents. This angle will vary as the tow crosses different current paths and as currents change with time and tide. Similarly, the system can also guard against the pipe touching sea bottom G, as depth and meteocean conditions change along the route.

Figure 3:
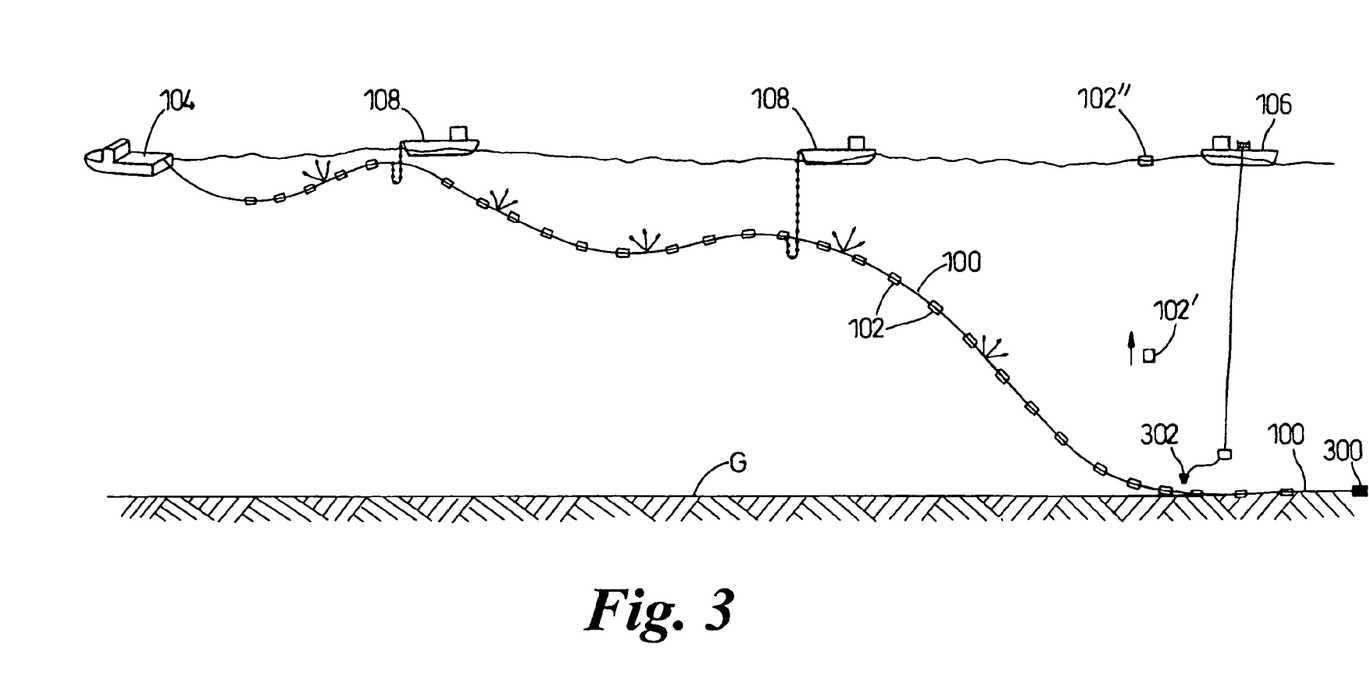
FIG. 3 illustrates the laying of the pipe to the seabed after towing.
Figure 4A:
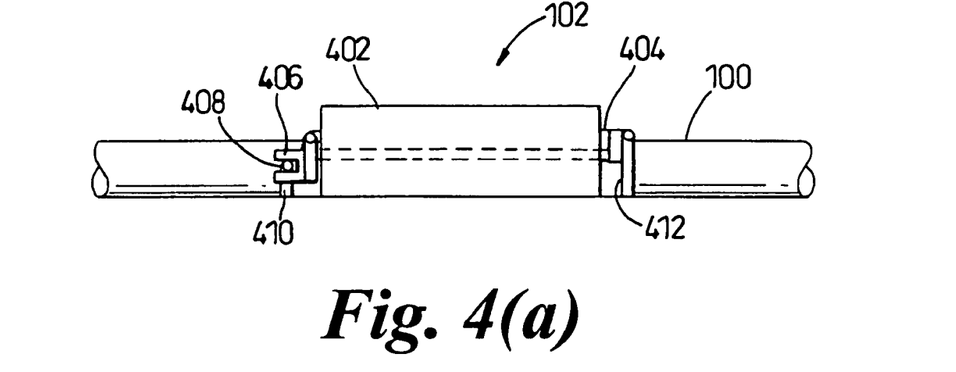
FIG. 4 shows in more detail the form and operation of detachable buoyancy elements used in the methods of FIGS. 1 to 3.
Figure 4B:
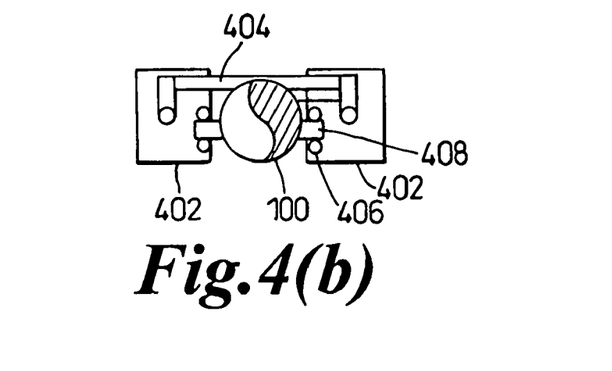
Figure 4C:
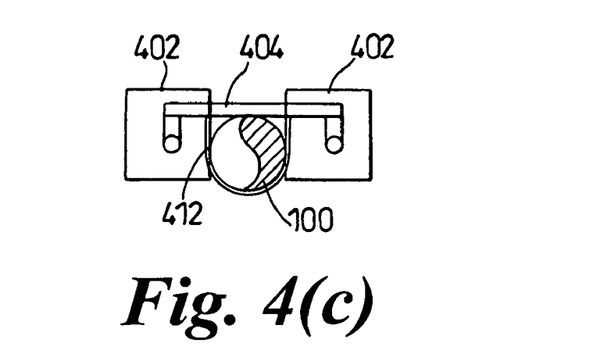
Figure 4D:
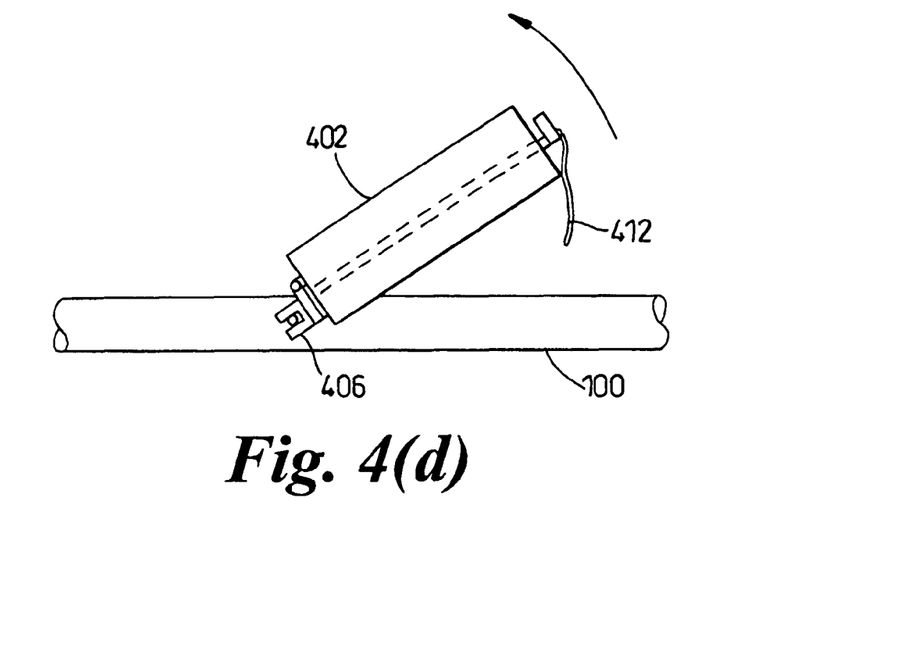
Figure 4E:
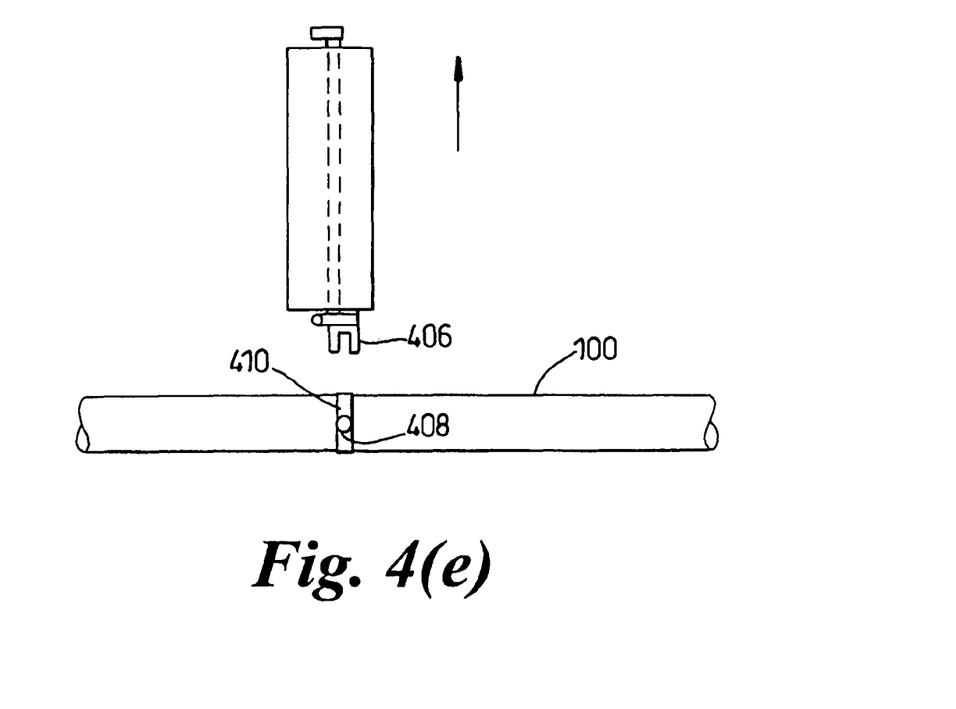

C—The Laying after the Tow to Site (Refer to FIG. 3 & FIG. 4)

Generally speaking, towed pipe sections towed by the known methods can only be laid down with a straight path. A curved path can only be followed with specialised and expensive equipment. By contrast, once the pipe 110 has arrived at the installation site using the wave surface tow method, the pipe can be laid along a specified curved route on the seabed using only the same common tugs. One procedure by which this can be achieved is illustrated in FIGS. 3 and 4 and comprises the following steps:

1. Positioning one extremity of the pipe into the initiation target area on the seabed G using a dead weight 300 to sink the pipe extremity, seen at the right hand side in FIG. 3. The tail end of the pipe 100 is lowered from tug 106 in this illustration, for the sake of example only. It does not matter whether it is the lead or trail end which is lowered first in general.

2. In the meantime the tugs 104, 108 on surface are controlling the position of the pipe under the action of the lateral current. This operation is achieved by integrating the environmental data in the tow management system of FIG. 2 to provide operational information and instructions to the ship skippers.

3. The tug 106 used to deploy the bottomed extremity is equipped with an ROV 302 (remotely operated vehicle) which releases the buoyancy elements 102 along the pipe 100 as the lay operation is progressing. Once disconnected, the buoyancy elements of the pipe are free (102') to ascend to the surface S, where they are collected (102"), possibly by another ship.

In conventional towing, pipes with a negative buoyancy have to be lowered horizontally, which means that one cannot really control the laying route which ends up more or less straight. Because in the novel process the pipe is laid down gradually as more and more of the buoyancy elements 102 are cut loose, it is possible to lay the pipe along a curved path by re-positioning the tugs supporting the unlaid portion as the operation progresses.

FIG. 4 shows in more detail one suitable form of buoyancy device 102 for use in the wave surface tow method. At (a) we see a side view of one such device attached to the pipe. The buoyant material is in two elements (foam blocks) 402 carried on a saddle frame 404 so as to lie either side of the pipe 100. This has the effect of reducing the surface exposed to the lateral current. At (b) and (c) are views of the same device from opposite ends. At the left hand end, shown at (b), the buoyant device has two forks 406 which engage spigots 408 projecting from a collar device 410 clamped permanently around the pipe. At the other end (c), the device is attached to the pipe via a fabric strap 412. Consequently, the buoyancy can be released by a single ROV operation cutting the strap 412 at one end. As shown in FIGS. 4 (c) and (d), the device will firstly pivot upward on the forks, away from any collision with the ROV. At a certain angle, the openings in the forks will allow the device to come free to drift under its own buoyancy to the surface, where it can be recovered by another working vessel.

Second Example

Figure 5:
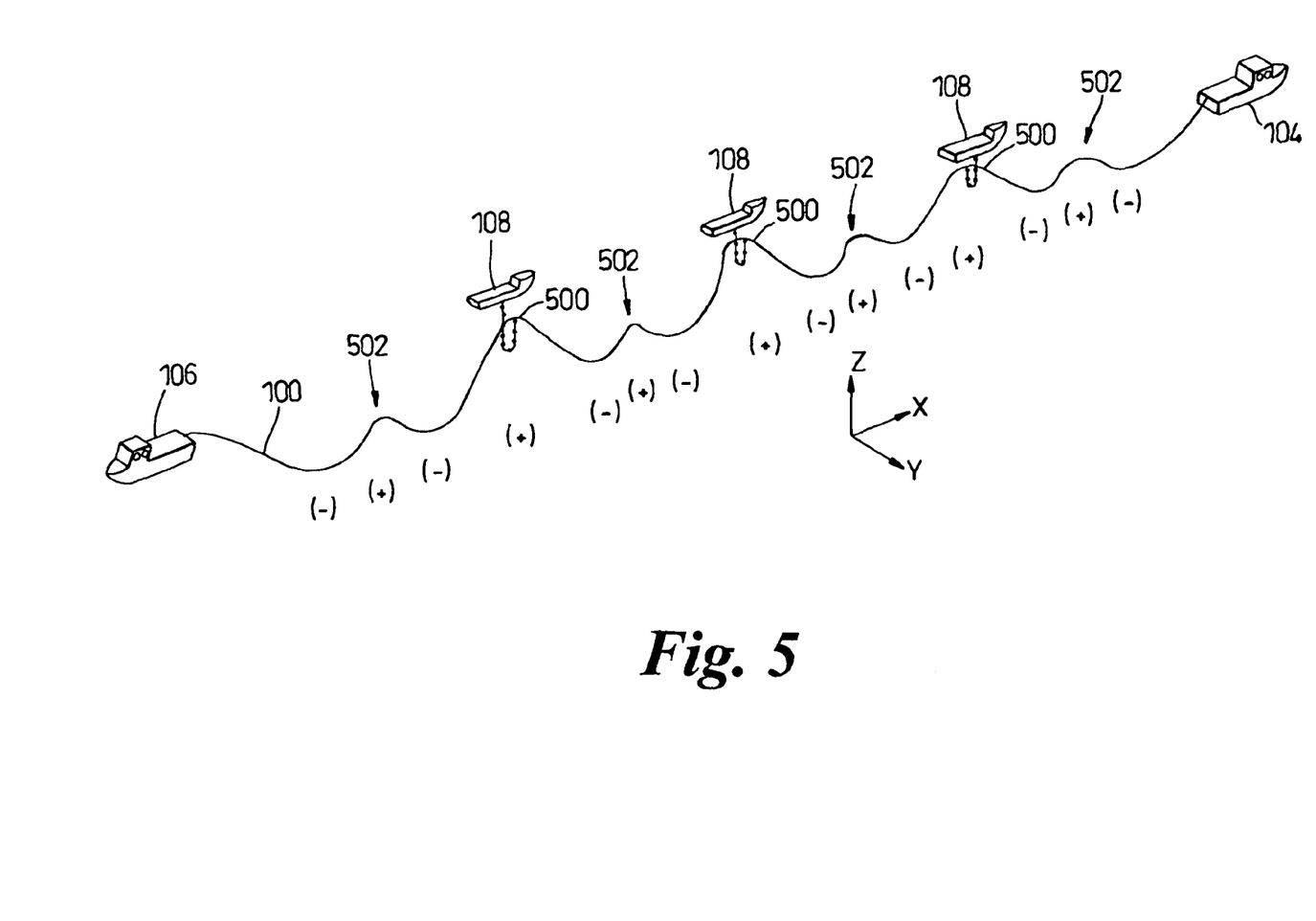
FIG. 5 shows a modified wave configuration still using five tugs but having additional mid-water peaks between tugs.

FIG. 5 illustrates another configuration which has been devised for a situation where we need to tow the pipe in shallow water before entering the deep water zone. To limit the depth of each trough in the wave profile to a value within the water depth, we might find that modelling indicates we have to produce more than three peaks, for example seven or eight. Rather than mobilise seven or eight intermediate tugs, the inventor has conceived a configuration with surface peaks supported by intermediate tugs and mid-water peaks in between the surface peaks which are not supported by tugs but are positively buoyant compared with the trough sections.

FIG. 5 illustrates a solution with seven humps for a 24-inch oil export pipeline with total pipe length of 12 miles=19312 m. The individual buoyancy elements 102 are too small to be shown on this scale. In this example, total net buoyancy of 1500 tonne is provided by 915 floats of 1 m×1 m×2.9 m each, total volume 2654 m^3 of buoyant material. Seven 'up' (+) sections of 1288 m length are fitted with floats spaced just closely enough to give net positive buoyancy of 52 N per meter of pipe (−52 N/m weight per meter of pipe). Eight 'down' (−) sections of 1287 m are fitted with fewer floats so as to have a weight of 56 N/m (56 N negative buoyancy per meter of pipe). The up sections are not all identical, however, being divided into three upper humps 500, for connection to intermediate tugs 108 and four intermediate depth humps 502. The three upper humps are achieved simply by loading with three extra pairs of floats compared with the intermediate depth humps 502. This additional buoyancy is sufficient to achieve a net positive buoyancy over the entire pipeline, such that, without further ballast or buoyancy, the whole assembly would float in its wave profile, with the tops of the upper humps just breaking the surface.

Figure 6:
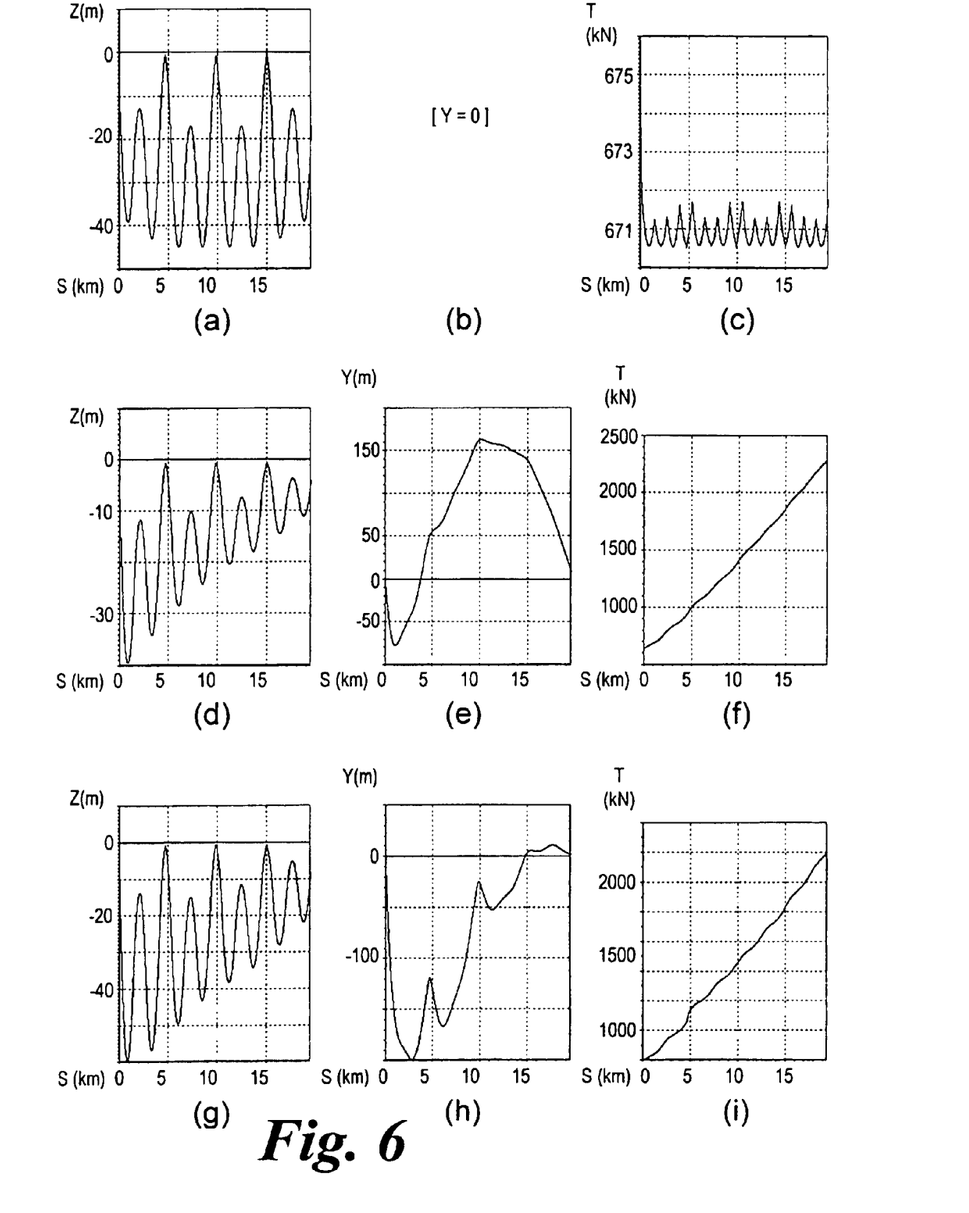
FIG. 6 illustrates various results of modelling of pipe behaviour in the planning of the wave surface tow operation shown in FIG. 5.

Preliminary modelling results for this pipe in three different situations are shown in FIG. 6 (a) to (i), generated using the well-known ORCAFLEX simulation system. X, Y and Z axes are illustrated on FIGS. 1 and 5 for reference. X is the direction between the lead and trail tugs, with X=0 indicating the trail tug position and X increasing toward the lead tug. Y is the direction orthogonal to X and parallel to the sea surface. Z is the direction normal to the surface, such that −Z indicates depth below sea surface. Graphs (a), (d) and (g) show the Z axis displacement (depth) of the pipe against the pipe length (arc length S rather than X displacement) in three different cases. Graphs (b), (e) and (h) show the Y axis (lateral) displacement of the pipe, relative to the line joining the lead and trail extremities of the tow, under the same three conditions. Finally, graphs (c), (f) and (i) show tension T in the pipeline at each point along its length.

It goes without saying that other parameters can be plotted in the modelling process, and each parameter can be compared against limits under different environmental conditions to test the feasibility of a given operation. Tension values, for example, must obviously be kept between maximum permitted tension and compression limits, for a design to be practical. If the limits are broken then inputs such as the positions of the tugs, bollard pull values, weight of chain etc can be adjusted and the model checked again. Note that no chain or guard vessel is yet modelled in these graphs and the results (tension, lateral displacement) would be improved if guard vessel and guard wire/chains are added.

The cases illustrated in FIG. 6 are as follows. Many simulations have been performed by the applicant and these demonstrate the tow configuration solution has flexibility and is reliable. Only a few representative results are presented here for illustration of the concepts at work.

Graphs (a)-(c) illustrate a Base Case—mean static situation (constant tension between lead & trail tugs and no movement or current). The seven peaks and eight troughs of the wave profile can be seen clearly in the Z graph (a). The Y graph (b) is not provided as the pipe in the static case simply follows a straight line between the lead and trail tugs. Similarly the tension is relatively low and relatively uniform along the length of the pipe, with local variations due to the tension between 'up' and 'down' sections only.

Graphs (d)-(f) illustrate the effect of towing with +2.5 knot vessel speed and a similar speed current flowing at 90 degrees to heading. The model is set up so that the pipeline orientation (X axis) is 41.5 degrees relative to the vessel heading. We see immediately from graphs (g) and (i) the effects of adding the towing motion. The wave depth profile Z is stretched and flattened toward the lead tug 104 (*S=19 km), as the tension T also increases to overcome the water resistance. A relatively low but non-zero tension T exists at S=0, as the trail tug 106 applies some counter-pull to maintain control. Because of the cross current and oblique heading, the pipeline deviates transversely from the line joining tugs 104 and 106, as shown in the Y graph (e).

For the two cases above, the distance between the lead tug and trail tug is assumed to be the same. These and other parameters can be varied and re-modelled, and the design fine-tuned in response to the modelling results. For example, the lead-trail vessel distance can be increased and the tension increased a little, to avoid pipe 100 touching the seabed.

Graphs (g) to (i) illustrate the result of the following changes in the configuration relative to the situation modelled in graphs (d) to (f):

Increase pipe weight for 'up' sections from −52 N/m to −101 N/m
Increase pipe weight for 'down' sections from 56 N/m to 112 N/m
Change pipe orientation from 41.5 deg to 40 deg
Bring stern tug 106 20 m closer to the lead tug 104 (or alternatively stern tow wire is 20 m shorter)
Add 3 guard vessels with chain attached to the pipeline at the 3 upper humps (guard chain 1=9te, guard chain 2=8.3te, guard chain 3=0te).

Obviously, in practice, one would make these variations one at a time to explore the effects of each one. The graphs of depth (−Z) allow checking against the depth of water on the tow route. The graphs of tension (T) allow each option to be compared against predetermined limits for tension and compression in the pipeline, above which damage might result. One could next try a +/−150 N/m configuration, in addition to the above +/50 N/m and +/−100 N/m configurations.

As further described above, these simulations can be updated repeatedly in light of actual conditions during a tow. While the attached buoyancy cannot easily be varied during towing, the position and pulling force of each tug and the weight of chain ballast can easily be adjusted in response to feedback from the monitoring and simulation system on board the lead tug, to keep the depth and tension values from exceeding predetermined limits.

Variations

Numerous variations are possible using the basic elements identified above. A few of these will be specifically described herein.

Where the pipe is close to the surface, a guard tug may be used to reduce the risk of collisions between normal sea traffic and an "up" portion of the pipe, without being physically coupled to the pipe. With conventional surface tow techniques, guard tugs must be in position at both sides of the towed article, to intervene with traffic from whichever side it approaches. In the novel wave surface tow method, the presence of the "down" portions permits a guard vessel to cross from side to side of the pipe without going all the way around the head or tail of the tow. This simple fact greatly reduces the number of tugs required in the novel method, compared with a conventional surface or submerged tow operation.

It is a matter of design choice whether to make the lead and trail extremities of the article positive or negative in buoyancy. Negative buoyancy is given to the extremities in the examples of FIGS. 1-6, but positive buoyancy sections may be appropriate in other circumstances, or positive at one end and negative at the other.

Figure 7:
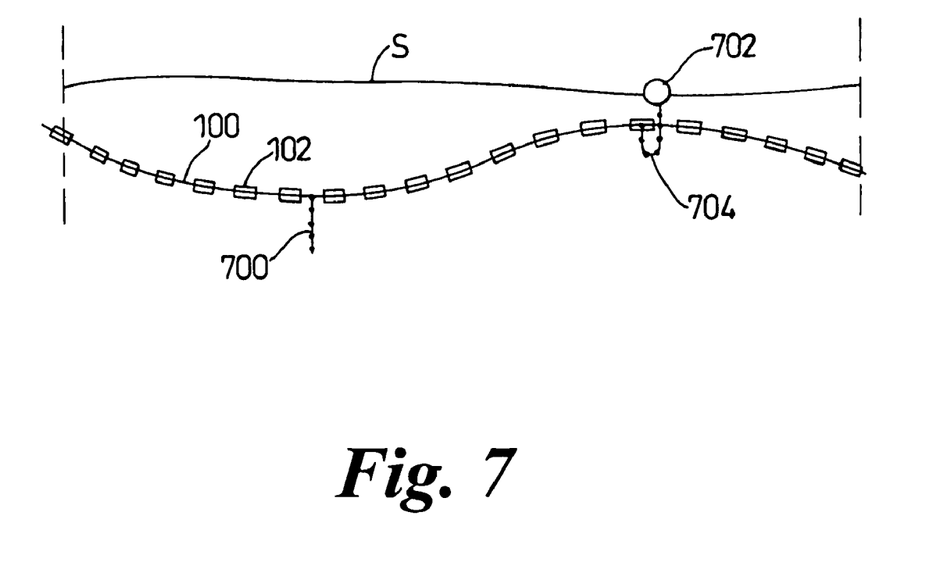
FIG. 7 shows a section of a wave surface tow assembly with certain optional features.

FIG. 7 illustrates two further variations that may be applied in appropriate circumstances. In a case where contact with the seafloor is expected or possible, short ballast chains 700 (not shown to scale) could also be attached to hang below the trough portions of the pipe, as an interface to the seafloor. As in the conventional controlled depth tow method, these chains would weigh the pipe down, but their ballast effect would be cancelled once the chain contacts the seabed below the pipe. Accordingly, although the assembly as a whole comes partially to rest on the seabed, the pipe itself will be held by its own buoyancy a certain distance above the seabed, not subject to undesirable shocks or stresses.

Particularly for shorter tows, or in seas without strong currents to contend with, one or more humps of the wave profile may be supported by a passive buoy 702 and not by a tug. A similar hanging loop of ballast chain 704 is fitted as in the case of the tugs shown in FIGS. 1 and 5. It is to be noted that this ballast chain creates a "soft" link to the buoy, in contrast to a fixed-length strop which is liable to transmit shocks to the pipeline as a result of wave action, and in extreme cases to break, leading to loss of the towed article.

SUMMARY OF BENEFITS

The techniques and equipment described above can bring a number of benefits according to the situation. Some of these benefits, particularly in comparison with over the known alternatives mentioned in the introduction, are described below. It is to be understood that the invention is not limited to embodiments in which all of the features described are used, and all the benefits derived at the same time.

- Provides an alternative tow method for installing flowlines when other known tow methods (bottom, off-bottom, controlled depth, surface or subsurface) cannot be used for technical, cost, schedule or risk reasons. "Wave surface tow" can be classified as a hybrid of surface and subsurface tow.
- Reduces the requirement for seabed survey relative to bottom tow, since the pipe is towed off the seabed.
- Allows optimisation of the bending stress along the pipe and compensation for the weight and buoyancy forces tolerances or uncertainties. The analysis would assist in assessing the distribution of the buoyancy and this would be optimised by limiting the number of buoyancy devices and spacing them so that the stress level remains acceptable. No bending restrictor is anticipated.
- Eliminates painstaking trimming operations which often take hours or even days in conventional tow techniques such as controlled-depth tow and off-bottom tow. The wave surface tow assembly is effectively self-trimming, any deviations from the ideal buoyancy profile being absorbed by deformation of the wave profile.
- Reduce the risk of losing buoyancy during towing operation.
- Reduces the risk of losing the pipe by ensuring it is at all times of the operation positively buoyant.
- Provides the best bollard pull optimisation for the Tugs. In the conventional controlled depth tow method, the pipeline can only be 'parked' on the seabed; to hold it still nearer the surface would require the tugs to apply a very high tension to keep the pipe straight. With wave surface tow, when the tow is still the pipe just needs a minimum tension to be controlled. Accordingly there is little risk of overstressing it and most of the bollard pull is actually used for the towing operation or controlling the elevation.
- Allows safe control of the pipe elevation of pipe string towed to a site by avoiding the utilisation of surface buoys attached to the pipe by means of strops. This eliminates the potential risk of losing those surface buoys which has happened previously in a tendon tow operation, losing the entire tendon.
- Provides the capability of arbitrarily submerging or bringing back to surface a towed pipe whenever it is desired.
- Allows temporarily securing the pipe on bottom in case of a problem occurs during towing (similar to the position at the start of the laying operation shown in FIG. 3, applying a dead weight but leaving the floats intact).
- Reduces the fatigue damage on the pipe resulting from surface wave action. This is a benefit from towing below the surface, where the alternative method is to use pencil buoys on a negatively buoyant pipe. In that alternative, the pencil buoys would be jerked by the wave and would induce some sort of action on the pipe. As well as fatiguing the pipe, this increases the risk that the link between the buoy and the pipe breaks.
- Allows lateral control of a pipe under the action of sea current. Trying to control a pipe (especially if it is long) laterally with only two tugs would be a real challenge under lateral current. The wave surface tow configuration makes this easier by allowing one or more intermediate tugs to be used (see the effect of the tugs in the graph of FIG. 6(h), for example. Additionally, the tow management described in relation to FIGS. 1 and 2 system would definitely help in providing the skipper with the right information.
- Allows the designer to avoid subsea or surface intermediate connection to lay and install subsea flowlines too long to be installed by other tow methods. Generally the limitation is bollard pull and capability to control the behaviour of the pipe when it is on surface.
- Reduce the risk of getting the towed pipe damaged by surface maritime traffic, compared with surface towing. Away from the tugs the wave surface tow configuration can sink the 'down' section of the pipe typically between 15 m to 100 m, depending on the water depth
- Provide the capacity to control a laying operation along a pre-defined curved route on the seabed both in shallow and ultra deep environment. Previously this could only be achieved with surface tow and a short pipeline (less than 4 km, say)
- Allow installing pipes in remote area, with local ship resources, instead of mobilising sophisticated and costly laying spreads normally allocated to other regions. The tugs proposed are DP (dynamic positioning) tugs which are commonly available throughout the world. FIG. 5 also illustrates how, by providing intermediate depth humps in the wave profile, a very long configuration with seven humps can be towed with the same number of tugs as the simpler configuration of FIG. 1.

From this list of benefits and the examples given, the skilled reader will appreciate that many modifications and variations are possible within the spirit and scope of the invention disclosed herein. The scope of protection is not limited by the examples.

The invention claimed is:

1. A method of towing an elongate article through water, comprising providing the article along its length with buoyancy adjusting material fitted closely to the article wherein said buoyancy adjusting material is sufficient to give the article overall a positive buoyancy so that it will not sink to the seabed and is distributed unevenly along the length of the article so as to create regions of negative buoyancy causing the article to adopt a wave profile with peaks and troughs along its length, connecting said article at its extremities to lead and trail tugs for controlling movement of the article through the water; and coupling at least one further tug to the article at an intermediate point between the extremities of the article, wherein the or at least one of the further tugs is used to apply ballast to control the depth of the article during towing.

2. A method as claimed in claim 1, wherein the elongate article is itself negatively buoyant, said buoyancy adjusting material comprising predominantly buoyant material.

3. A method as claimed in claim 2, wherein said buoyant material comprises predominately a series of floats coupled closely to the article at intervals along its length.

4. A method as claimed in claim 3, wherein the floats are identical in form, the interval between floats being increased in said regions of negative buoyancy relative to other regions.

5. A method as claimed in claim 3, wherein the floats are shaped so as to lie alongside the article so as to avoid substantially increasing its cross-section with respect to cross-currents while towing.

6. A method as claimed in claim 3, wherein the floats are detachable individually under remote control.

7. A method as claimed in claim 1, wherein the elongate article itself is positively buoyant, said buoyancy adjusting material comprising ballast.

8. A method as claimed in claim 1, wherein the or each further tug is coupled to the article at or near a peak in said wave profile.

9. A method as claimed in claim 1, wherein said profile includes plural peaks spaced along the length of the article.

10. A method as claimed in claim 9, wherein the spacing of said peaks is greater than 1000 m.

11. A method as claimed in claim 1, wherein the magnitude of buoyancy variation between peaks and troughs is between 50 and 400 N/m.

12. A method of installing an elongate article at a target location sub-sea, the method comprising:
towing the article to the target location while maintained in a buoyant condition by buoyant material applied to the article and distributed continuously or at regular intervals along its length;
sinking a first end of the article to the seabed at the target location using ballast while applying a predetermined tension on the other end to maintain the form of the article within predefined limits; and
removing the buoyant material progressively along the length of the article so as to sink the article and lay it progressively on the seabed, maintaining and controlling the applied tension as the laying progresses,
wherein the article is laid along a desired curved route by varying the direction of said applied tension as said sinking progresses so as to cause the article to bend to said curved route during laying.

13. A method as claimed in claim 12, wherein the buoyant material is predominantly in the form of numerous discrete floats applied to the article and removable individually by remote control.

14. A buoyant device for coupling to an elongate article and subsequent decoupling by remote control, the buoyant device comprising a pair of bodies adapted to lie either side of a portion of the elongate article and being provided with a first coupling for forming a pivotal coupling between the device and a first point on said article to permit the device to pivot into and out of alignment with the article, the device further being provided with a second coupling for binding the device to a second point on the article so as to maintain the device in alignment, wherein the distribution of buoyant material relative to said first and second couplings is such that the device will pivot out of alignment with the article when the second coupling is released and wherein the first coupling has an open portion adapted to permit separation of the device from the article when the device pivots out of alignment.

15. A device as claimed in claim 14, wherein the second coupling comprises a strap which can be cut to release the second coupling.

16. A method of using a plurality of buoyant devices as claimed in claim 14 to progressively sink an article, the second coupling of said devices being released sequentially by remote control.

17. A method as claimed in claim 13, wherein the release of the second coupling is performed by a remotely operated vehicle (ROV).

18. A method as claimed in claim 12, wherein the direction of applied tension is varied during laying by repositioning of tugs supporting the unlaid portion a laying progresses.

19. A method as claimed in claim 12, wherein the article is in excess of 4 km length.

20. A method of towing an elongate article through water, comprising providing the article along its length with buoyancy adjusting material fitted closely to the article wherein said buoyancy adjusting material is sufficient to give the article overall a positive buoyancy so that it will not sink to the seabed and is distributed unevenly along the length of the article so as to create regions of negative buoyancy causing the article to adopt a wave profile with peaks and troughs along its length, connecting said article at its extremities to lead and trail tugs for controlling movement of the article through the water; and coupling plural further tugs, each coupled to different intermediate points along the length of the article.

21. A method of towing an elongate article through water, comprising providing the article along it length with buoyancy adjusting material fitted closely to the article wherein said buoyancy adjusting material is sufficient to give the article overall a positive buoyancy so that it will not sink to the seabed and is distributed unevenly along the length of the article so as to create regions of negative buoyancy causing the article to adopt a wave profile with peaks and troughs along its length, connecting said article at its extremities to lead and trail tugs for controlling movement of the article through the water
monitoring the towing operation to measure (i) the depth of the article at known points along its length, (ii) the positions of the tugs and their respective bollard pull values; and (iii) subsea currents;
combining those measurements with a computerised model of the article to calculate one or more parameters of the operation; and
controlling the tugs in response to said calculations so as to maintain said parameters within predetermined limits.

* * * * *